(12) United States Patent
Zhu et al.

(10) Patent No.: US 8,666,074 B2
(45) Date of Patent: Mar. 4, 2014

(54) OPTICAL FIBER SECURE COMMUNICATION APPARATUS AND DATA ENCRYPTION METHOD THEREFOR

(75) Inventors: Ninghua Zhu, Beijing (CN); Wei Chen, Beijing (CN); Jianguo Liu, Beijing (CN)

(73) Assignee: Institute of Semiconductors Chinese Academy of Sciences, Beijing (CN)

( * ) Notice: Subject to any disclaimer, the term of this patent is extended or adjusted under 35 U.S.C. 154(b) by 795 days.

(21) Appl. No.: 12/794,418

(22) Filed: Jun. 4, 2010

(65) Prior Publication Data
US 2011/0096925 A1  Apr. 28, 2011

(30) Foreign Application Priority Data
Oct. 28, 2009  (CN) ............................ 2009 1 0236702

(51) Int. Cl.
*H04K 1/04*  (2006.01)
(52) U.S. Cl.
USPC .......................................................... 380/256
(58) Field of Classification Search
USPC .......................................................... 380/256
See application file for complete search history.

(56) References Cited

U.S. PATENT DOCUMENTS

| | | | | |
|---|---|---|---|---|
| 5,864,625 | A * | 1/1999 | Rutledge ........................ | 380/31 |
| 6,377,782 | B1 * | 4/2002 | Bishop et al. ................ | 455/3.01 |
| 6,577,732 | B1 * | 6/2003 | Kartalopoulos ............... | 380/33 |
| 7,830,926 | B1 * | 11/2010 | Kim ................................ | 372/20 |
| 7,917,039 | B1 * | 3/2011 | Delfyett ........................ | 398/182 |
| 2003/0174942 | A1 * | 9/2003 | Murshid et al. ................ | 385/31 |
| 2005/0141716 | A1 * | 6/2005 | Kumar et al. .................. | 380/255 |
| 2007/0183715 | A1 * | 8/2007 | Murshid et al. ................ | 385/31 |
| 2011/0064410 | A1 * | 3/2011 | Beckett et al. ................. | 398/63 |
| 2011/0161657 | A1 * | 6/2011 | So ................................. | 713/153 |
| 2013/0010951 | A1 * | 1/2013 | Britz et al. .................... | 380/33 |

* cited by examiner

*Primary Examiner* — Tamara T Kyle
(74) *Attorney, Agent, or Firm* — Osha Liang LLP

(57) ABSTRACT

An optical fiber secure communication apparatus and a data encryption method therefor are provided. The apparatus comprises a transmitter and a receiver being connected with each other via an optical fiber. The transmitter comprises a PPC processor unit, a field programmable gate array test board, a light-emitting module, an optical fiber coupler and a connection optical fiber. The receiver comprises a wavelength division multiplexer, a connection optical fiber, a photodetector, a field programmable gate array test board, a PPC processor unit and a signal output interface. At the transmitter end, two or more paths of input data are forwarded by the PPC, encrypted by the FPGA and then transmitted to the light-emitting module of two or more wavelengths for conversion from electrical signals into optical signals. At the receiver end, signals of two or more wavelengths enter the photodetector for conversion into electrical signals, which are decrypted by the FPGA and then forwarded by the PPC for output. With the present invention, the security of transmission data is improved and the difficulty in cracking data is increased.

9 Claims, 4 Drawing Sheets

OPTICAL FIBER SECURE COMMUNICATION APPARATUS AND DATA ENCRYPTION METHOD THEREFOR

FIELD OF THE INVENTION

The present invention relates to the field of optical fiber communication technology, and more particularly, to an optical fiber secure communication apparatus and a data encryption method therefor.

BACKGROUND OF THE INVENTION

With development of the communication industry, especially of the optical communication having broad bandwidth, security of information is of increasing concern. Safety and security have become a chief issue in the communication industry. Common encryption approaches for the optical communication include information encoding encryption, algorithm encryption, frequency hopping encryption as well as quantum encryption which is recently developed. However, the quantum encryption is, so far, just in the experimental phase and is quite far from commercial applications.

The concept of frequency hopping encryption originates from the wireless frequency hopping communication in which a transmitter continuously switches its carrier wavelength according to a frequency hopping pattern and a receiver has to switch its wavelength in the same manner so as to receive complete information. Also, the interference immunity can be improved due to continuous switching of the carrier. As the frequency hopping sequence is randomly generated and thus is irregular, it is difficult to be cracked.

Currently, the algorithm encryption is commonly employed as one applicable to the communication encryption. However, no matter how complicated an encryption algorithm is, there is a certain degree of regularity. Thus, it can be cracked by analyzing the regularity of data variation.

According to the present invention, the algorithm encryption and the frequency hopping encryption are combined to provide a novel data encryption method by which it is possible to encrypt transmission data without losing the advantage of broad bandwidth of the optical communication.

SUMMARY OF THE INVENTION

Problem to be Solved

A major object of the present invention is to provide an optical fiber secure communication apparatus and a data encryption method therefor, by which it is possible to improve the security of transmission data and to increase the difficulty in cracking the data.

Technical Solution

To achieve the above object, the present invention is made.

According to an aspect of the invention, there is provided an optical fiber secure communication apparatus, which comprises a transmitter and a receiver being connected with each other via an optical fiber, wherein the transmitter comprises a first signal input interface, a second signal input interface, a first PPC processor unit, a first field programmable gate array (FPGA) test board, a first semiconductor laser, a second semiconductor laser, a first $LiNbO_3$ modulator, a second $LiNbO_3$ modulator, a first co-axial transmission line, a second co-axial transmission line, an optical fiber coupler, a first connection optical fiber and a second connection optical fiber; wherein the first signal input interface and the second signal input interface are connected to the first FPGA test board via the first PPC processor unit; those two paths of signals are encrypted by the first FPGA test board and then loaded onto the first $LiNbO_3$ modulator and the second $LiNbO_3$ modulator via the first co-axial transmission line and the second co-axial transmission line, respectively; two paths of modulated lights enter the optical fiber coupler via the first connection optical fiber and the second connection optical fiber respectively and are then combined into one path of output light; the first semiconductor laser and the first $LiNbO_3$ modulator as well as the second semiconductor laser and the second $LiNbO_3$ modulator constitute light-emitting modules, respectively; and the receiver comprises a wavelength division multiplexer, a third connection optical fiber, a fourth connection optical fiber, a first photodetector, a second photodetector, a second FPGA test board, a second PPC processor unit, a first signal output interface and a second signal output interface; wherein optical signals are inputted to the wavelength division multiplexer via the optical fiber connecting the transmitter with the receiver; the optical signals each having a respective wavelength of $\lambda_1$ and $\lambda_2$ enter the first photodetector and the second photodetector via the third connection optical fiber and the fourth connection optical fiber, respectively; two paths of electrical signals converted by the detectors are decrypted by the second FPGA test board, forwarded by the second PPC processor unit and then outputted via the first signal output interface and the second signal output interface respectively.

Preferably, the first signal input interface and the second signal input interface are each an electrical signal interface or an optical input interface; the optical fiber coupler is an optical fiber coupler or a multiple-to-one wavelength division multiplexer; and the first co-axial transmission line and the second co-axial transmission line are each a microstrip transmission line directly arranged on a circuit board.

Preferably, the first PPC processor unit and the second PPC processor unit are configured for forwarding data; the first FPGA test board is configured for encrypting data; the second FPGA test board is configured for decrypting data; the first PPC processor unit and the first FPGA test board are arranged on a same circuit board, and the second PPC processor unit and the second FPGA test board are arranged on a same circuit board.

Preferably, the light-emitting module comprises a laser and an external modulator, or else comprises a DFB laser/EA modulator-integrated light source, or else comprises a direct modulation semiconductor laser.

Preferably, the first $LiNbO_3$ modulator and the second $LiNbO_3$ modulator each further comprise a drive circuit, and optionally a signal level conversion when the signal level is mismatched.

Preferably, the first semiconductor laser and the second semiconductor laser are each a wavelength tunable semiconductor laser whose emitting wavelength is controlled by a control circuit of the first FPGA test board.

Preferably, a 2×2 optical switch is further arranged between the first semiconductor laser and the first $LiNbO_3$ modulator as well as between the second semiconductor laser and the second $LiNbO_3$ modulator, which is configured to switch signals under control of a control circuit of the first FPGA test board.

Preferably, the wavelength division multiplexer is a Mach-Zehnder interferometer filter composed of two 3 dB optical fiber couplers.

Preferably, at the transmitter, two or more paths of input data are forwarded by the first PPC processor unit, encrypted by the first FPGA test board and then transmitted to the light-emitting modules of two or more wavelengths for conversion from electrical signals into optical signals.

Preferably, at the receiver, signals of two or more wavelengths enter the first photodetector and the second photodetector, respectively, for conversion into electrical signals, which are decrypted by the second FPGA test board and then forwarded by the second PPC processor unit to be outputted.

According to a further aspect of the invention, there is provided a data encryption method for an optical fiber secure communication apparatus is provided, which comprises steps of:

pre-framing service data and performing algorithm encryption on the service data in a unit of group comprising a plurality of frames, the number of frames in each group being dependent on a security level;

re-framing the encrypted service data and interchanging the framed data among different signal paths according to a frequency hopping sequence;

delaying the respective paths of data differently to perform data encryption; and modulating the encrypted data at a transmitter of the optical fiber secure communication apparatus.

Preferably, the step of interchanging the framed data according to the frequency hopping sequence is achieved by an optical switch.

Advantageous Effects

It can be seen from the above that the present invention has the following advantageous effects.

1) With the optical fiber secure communication apparatus according to the present invention, the transmitter interchanges the input data between the two paths in a unit of frame according to a frequency hopping sequence. Thus, a cracker has to obtain the both paths of signals and know the frequency hopping sequence and exact frame identifications in order to continuously recover the frame data.

2) With the optical fiber secure communication apparatus according to the present invention, the transmitter pre-frames the service data and performs algorithm encryption on the service data in a unit of group comprising a plurality of frames before interchanging the data frames. Thus, even if a cracker knows the encryption algorithm and the frame identifications, the cracker has to obtain the complete frame data in order to recover the original information segment for obtaining the actual information. As an example, for 100 frames of data, a cracker without the knowledge about the frequency hopping sequence will have to try $2^{100}$ (about $10^{30}$) times before obtaining a segment of useful information, which is nearly an impossible task.

3) With the optical fiber secure communication apparatus according to the present invention, non-service data such as synchronization information and frame identifications are scrambled at the transmitter according to the data encryption scheme, such that it is more difficult for a cracker to crack the frame identifications.

4) In the transmitter of the optical fiber secure communication apparatus according to the present invention, an additional wavelength encoding may be provided by replacing the common semiconductor laser with a tunable semiconductor laser, thereby increasing the difficulty in intercepting and cracking information.

BRIEF DESCRIPTION OF DRAWINGS

For further illustration of the present invention, embodiments of the present invention will be described in detail in the following with reference to the drawings, in which.

Figure 1:
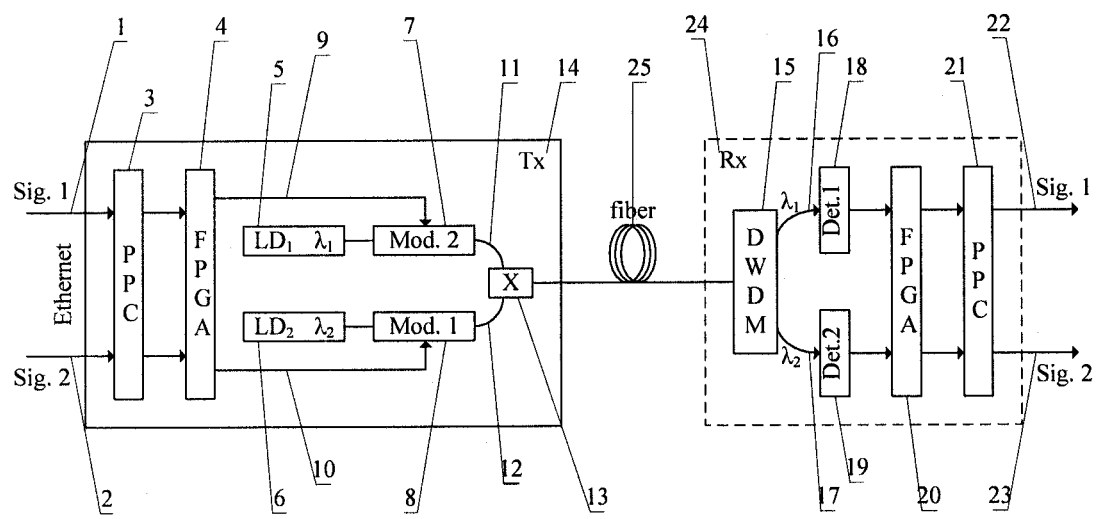
FIG. 1 is a structural diagram showing an optical fiber secure communication apparatus according to an embodiment of the present invention.

REFERENCE NUMERALS 1, 2 signal input interface
3 PowerPC (PPC) processor unit
4 field programmable gate array (FPGA) test board
5, 6 semiconductor laser
7, 8 LiNbO$_3$ modulator
9, 10 co-axial transmission line
11, 12 connection optical fiber
13 1×2 optical fiber coupler
14 transmitter
15 wavelength division multiplexer
16, 17 connection optical fiber
18, 19 photodetector
20 field programmable gate array (FPGA) test board
21 PPC processor unit
22, 23 signal output interface
24 receiver
25 connection optical fiber

DETAILED DESCRIPTION OF EMBODIMENTS

The present invention will be further described in detail in the following in conjunction with embodiments thereof with reference to the drawings, so that the above and other objects, features and advantages of the present invention become more apparent.

The present invention borrows the concept of the wireless frequency hopping communication in combination with the algorithm encryption, to achieve signal encryption by alternately loading signals on two different optical wavelengths according to a frequency hopping sequence and also scrambling data based on a certain algorithm.

FIG. 1 is a structural diagram showing an optical fiber secure communication apparatus according to an embodiment of the present invention. As shown in FIG. 1, the apparatus comprises a transmitter 14 and a receiver 24 being connected with each other via an optical fiber 25, wherein the transmitter 14 comprises a first signal input interface 1, a second signal input interface 2, a first PowerPC (PPC) processor unit 3, a first field programmable gate array (FPGA) test board 4, a first semiconductor laser 5, a second semiconductor laser 6, a first LiNbO$_3$ modulator 7, a second LiNbO$_3$ modulator 8, a first co-axial transmission line 9, a second co-axial transmission line 10, an optical fiber coupler 13, a first connection optical fiber 11 and a second connection optical fiber 12; wherein the first signal input interface 1 and the second signal input interface 2 are connected to the first FPGA test board 4 via the first PPC processor unit 3; those two paths of signals are encrypted by the first FPGA test board 4 and then loaded onto the first LiNbO$_3$ modulator 7 and the second LiNbO$_3$ modulator 8 via the first co-axial transmission line 9 and the second co-axial transmission line 10, respectively; two paths of modulated lights enter the optical fiber coupler 13 via the first connection optical fiber 11 and the second connection optical fiber 12 respectively and are then combined into one path of output light; the first semiconductor laser 5 and the first LiNbO$_3$ modulator 7 as well as the second semiconductor laser 6 and the second LiNbO$_3$ modulator 8 constitute light-emitting modules, respectively; and the receiver 24 comprises a wavelength division multiplexer 15, a third connection optical fiber 16, a fourth connection optical fiber 17, a first photodetector 18, a second photodetector 19, a second FPGA test board 20, a second PPC processor unit 21, a first signal output interface 22 and a second signal output interface 23; wherein optical signals are inputted to the wavelength division multiplexer 15 via the optical fiber 25 connecting the transmitter 14 with the receiver 24; the optical signals each having a respective wavelength of $\lambda_1$ and $\lambda_2$ enter the first photodetector 18 and the second photodetector 19 via the third connection optical fiber 16 and the fourth connection optical fiber 17, respectively; two paths of electrical signals converted by the detectors are decrypted by the second FPGA test board 20, forwarded by the second PPC processor unit 21 and then outputted via the first signal output interface 22 and the second signal output interface 23 respectively.

Although there are two paths of signals inputted to the transmitter as described above, the present invention is not limited thereto and there may be two or more paths of input signals. While the first signal input interface 1 and the second signal input interface 2 as described above are electrical signal interfaces (such as general network interfaces), they may be optical input interfaces. The optical fiber coupler 13 is an optical fiber coupler, or otherwise it may be a multiple-to-one wavelength multiplexer, i.e., it may be replaced with a multiple-to-one wavelength multiplexer. Further, the first co-axial transmission line 9 and the second co-axial transmission line 10 are each a microstrip transmission line directly arranged on a circuit board.

The first PPC processor unit 3 and the second PPC processor unit 21 are configured for forwarding data; the first FPGA test board 4 is configured for encrypting data; the second FPGA test board 20 is configured for decrypting data; the first PPC processor unit 3 and the first FPGA test board 4 are arranged on one same circuit board, and the second PPC processor unit 21 and the second FPGA test board 20 are arranged on one same circuit board.

The light-emitting module comprises a laser and an external modulator, or else comprises a DFB laser/EA modulator-integrated light source, or else comprises a direct modulation semiconductor laser.

The first LiNbO$_3$ modulator 7 and the second LiNbO$_3$ modulator 8 each further comprise a drive circuit, and optionally a signal level conversion when the signal level is mismatched.

The first semiconductor laser 5 and the second semiconductor laser 6 are each a wavelength tunable semiconductor laser whose emitting wavelength is controlled by a control circuit of the first FPGA test board 4.

Figure 3:
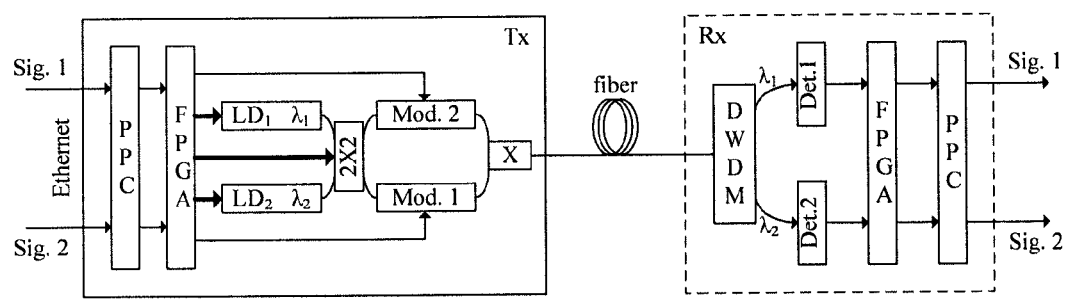
FIG. 3 is a structural diagram showing the optical fiber secure communication apparatus with a transmitter into which a 2×2 optical switch is added according to an embodiment of the present invention.

A 2×2 optical switch is further arranged between the first semiconductor laser 5 and the first LiNbO3 modulator 7 as well as between the second semiconductor laser 6 and the second LiNbO3 modulator 8, which is configured to switch signals under control of a control circuit of the first FPGA test board 4, as illustrated in FIG. 3.

The wavelength division multiplexer 15 is a Mach-Zehnder interferometer filter composed of two 3 dB optical fiber couplers.

The optical fiber coupler 13, the first connection optical fiber 11, the second connection optical fiber 12 as well as the wavelength division multiplexer 15, the third connection optical fiber 16 and the fourth connection optical fiber 17 may be replaced with free-space optical path devices.

Figure 2A:
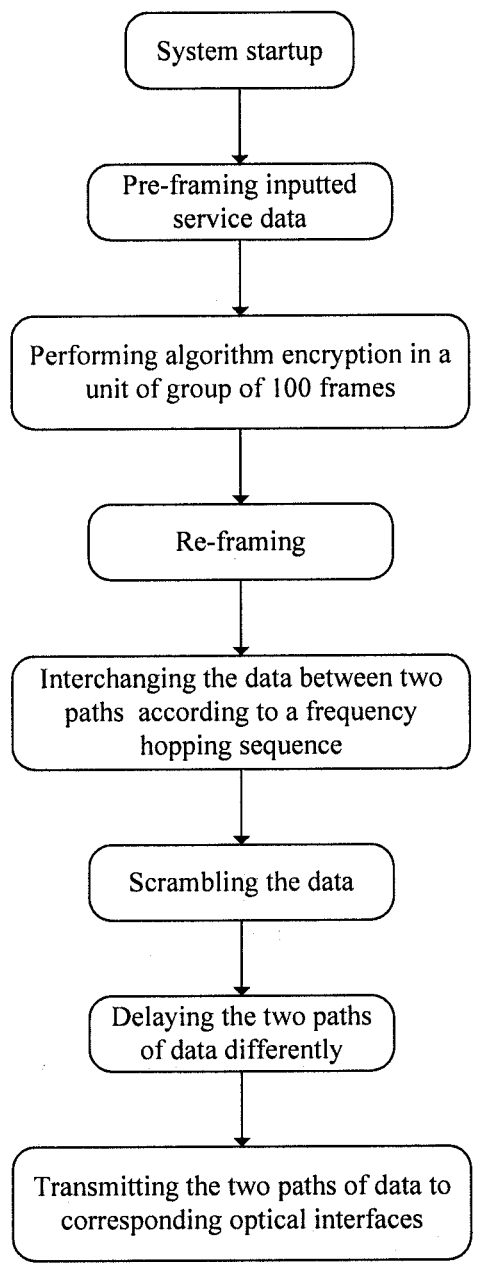
FIG. 2 is a flowchart showing data encryption and decryption method for the optical fiber secure communication apparatus according to an embodiment of the present invention.
Figure 2B:
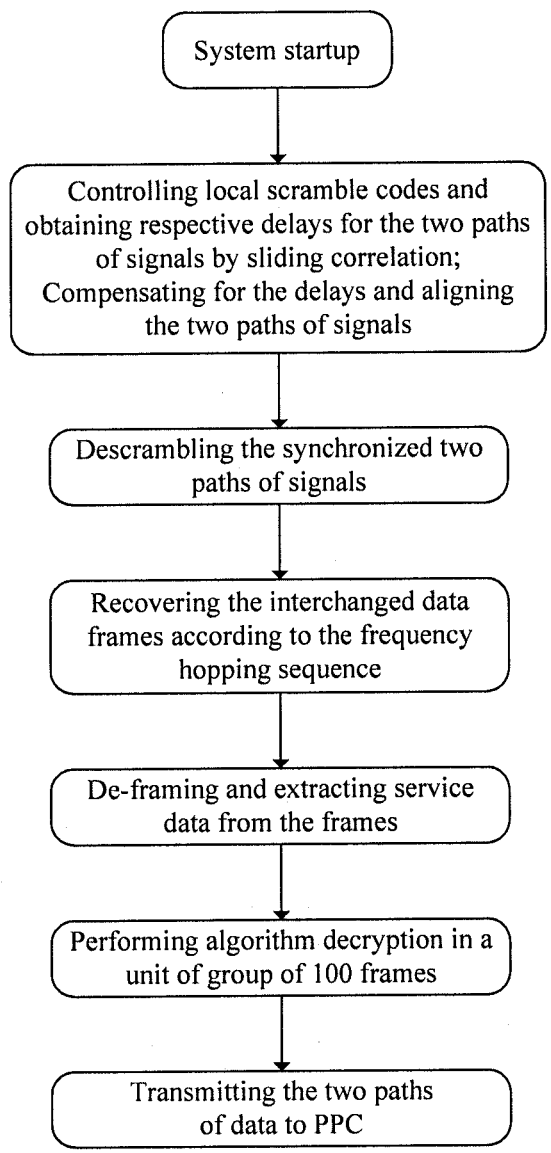

FIG. 2 is a flowchart showing a data encryption and decryption method for the optical fiber secure communication apparatus as shown in FIG. 1 according to an embodiment of the invention. Herein, FIG. 2a is a flowchart showing the data encryption method for the optical fiber secure communication apparatus, and FIG. 2b is a flowchart showing the data decryption method for the optical fiber secure communication apparatus.

As shown in FIG. 2a, the data encryption method for the optical fiber secure communication apparatus according to the embodiment of the present invention comprises steps of: pre-framing service data and performing algorithm encryption on the service data in a unit of group comprising a plurality of frames, the number of frames in each group being dependent on a security level; re-framing the encrypted service data and interchanging the framed data among different signal paths according to a frequency hopping sequence; delaying the respective paths of data differently to perform data encryption; and modulating the encrypted data at the transmitter of the optical fiber secure communication apparatus. Herein, the step of interchanging the framed data among the different paths according to the frequency hopping sequence is achieved by the optical switch.

As shown in FIG. 2b, the data decryption method for the optical fiber secure communication apparatus according to the embodiment of the present invention is an inverse operation of the encryption.

Herein, the data encryption and decryption are both performed by FPGA functional modules, where input data is subject to pre-framing, algorithm encrypting, re-framing and interchanging according to the frequency hopping sequence, so as to be encrypted.

At the transmitter end, two or more paths of input data are forwarded by the first PPC processor unit 3, encrypted by the first FPGA test board 4 and then transmitted to the light-emitting modules of two or more wavelengths for conversion from electrical signals into optical signals.

At the receiver end, signals of two or more wavelengths enter the first photodetector 18 and the second photodetector 19, respectively, for conversion into electrical signals, which are decrypted by the second FPGA test board 20 and then forwarded by the second PPC processor unit 21 to be outputted.

The objects, features and advantageous effects of the present invention have been described in detail with respect to the above embodiments. It should be understood that the above description is only illustration of the particular embodiments of the present invention, rather than limitation of the invention. Therefore, modifications, equivalent alternatives and improvements may be made without departing from the spirits and principles of the present invention, which all fall into the scope of the present invention.

What is claimed is:

1. An optical fiber secure communication apparatus, comprising a transmitter and a receiver being connected with each other via an optical fiber, wherein the transmitter comprises a first signal input interface, a second signal input interface, a first PPC processor unit, a first field programmable gate array test board, a first semiconductor laser, a second semiconductor laser, a first LiNbO$_3$ modulator, a second LiNbO$_3$ modulator, a first co-axial transmission line, a second co-axial transmission line, an optical fiber coupler, a first connection optical fiber and a second connection optical fiber;

wherein the first signal input interface and the second signal input interface are connected to the first FPGA test board via the first PPC processor unit; those two paths of signals are encrypted by the first FPGA test board and then loaded onto the first LiNbO$_3$ modulator and the second LiNbO$_3$ modulator via the first co-axial transmission line and the second co-axial transmission line, respectively; two paths of modulated lights enter the optical fiber coupler via the first connection optical fiber and the second connection optical fiber respectively and are then combined into one path of output light; the first semiconductor laser and the first LiNbO$_3$ modulator as well as the second semiconductor laser and the second LiNbO$_3$ modulator constitute light-emitting modules, respectively; and the receiver comprises a wavelength division multiplexer, a third connection optical fiber, a fourth connection optical fiber, a first photodetector, a second photodetector, a second FPGA test board, a second PPC processor unit, a first signal output interface and a second signal output interface; wherein optical signals are inputted to the wavelength division multiplexer via the optical fiber connecting the transmitter with the receiver; the optical signals each having a respective wavelength of $\lambda_1$ and $\lambda_2$ enter the first photodetector and the second photodetector via the third connection optical fiber and the fourth connection optical fiber, respectively; two paths of electrical signals converted by the detectors are decrypted by the second FPGA test board, forwarded by the second PPC processor unit and then outputted via the first signal output interface and the second signal output interface respectively, wherein a 2×2 optical switch is further arranged between the first semiconductor laser and the first LiNbO$_3$ modulator as well as between the second semiconductor laser and the second LiNbO$_3$ modulator, which is configured to interchange signals between the two paths of signals according to a frequency hopping sequence under control of a control circuit of the first FPGA test board.

2. The optical fiber secure communication apparatus according to claim 1, wherein the first signal input interface and the second signal input interface are each an electrical signal interface or an optical input interface; the optical fiber coupler is an optical fiber coupler or a multiple-to-one wavelength division multiplexer; and the first co-axial transmission line and the second co-axial transmission line are each a microstrip transmission line directly arranged on a circuit board.

3. The optical fiber secure communication apparatus according to claim 1, wherein the first PPC processor unit and the second PPC processor unit are configured for forwarding data; the first FPGA test board is configured for encrypting data; the second FPGA test board is configured for decrypting data; the first PPC processor unit and the first FPGA test board are arranged on a same circuit board, and the second PPC processor unit and the second FPGA test board are arranged on a same circuit board.

4. The optical fiber secure communication apparatus according to claim 1, wherein the light-emitting module comprises a laser and an external modulator, or else comprises a DFB laser/EA modulator-integrated light source, or else comprises a direct modulation semiconductor laser.

5. The optical fiber secure communication apparatus according to claim 1, wherein the first LiNbO$_3$ modulator and the second LiNbO$_3$ modulator each further comprise a drive circuit, and optionally a signal level conversion when the signal level is mismatched.

6. The optical fiber secure communication apparatus according to claim 1, wherein the first semiconductor laser and the second semiconductor laser are each a wavelength tunable semiconductor laser whose emitting wavelength is controlled by a control circuit of the first FPGA test board.

7. The optical fiber secure communication apparatus according to claim 1, wherein the wavelength division multiplexer is a Mach-Zehnder interferometer filter composed of two 3 dB optical fiber couplers.

8. The optical fiber secure communication apparatus according to claim 1, wherein at the transmitter, two or more paths of input data are forwarded by the first PPC processor unit, encrypted by the first FPGA test board and then transmitted to the light-emitting modules of two or more wavelengths for conversion from electrical signals into optical signals.

9. The optical fiber secure communication apparatus according to claim 1, wherein at the receiver, signals of two or more wavelengths enter the first photodetector and the second photodetector, respectively, for conversion into electrical signals, which are decrypted by the second FPGA test board and then forwarded by the second PPC processor unit to be outputted.

* * * * *